Jan. 27, 1959 L. E. RINKER ET AL 2,870,640

RADIO RELAY OR REPEATER STATION TIME SYNCHRONIZING SWITCH

Filed Feb. 18, 1958

INVENTOR.
LYMAN E. RINKER
HAROLD G. LEE
BY
BUCKHORN CHEATHAM & BLORE
ATTORNEYS 2,870,640
Patented Jan. 27, 1959

2,870,640

RADIO RELAY OR REPEATER STATION TIME SYNCHRONIZING SWITCH

Lyman E. Rinker and Harold G. Lee, Portland, Oreg., assignors to Leupold & Stevens Instruments, Inc., Portland, Oreg., a corporation of Oregon Application February 18, 1958, Serial No. 715,957

5 Claims. (Cl. 74—209)

Our present invention comprises a time synchronizing mechanism of particular utility in a receiving station for receiving meteorological, hydrographic or other data transmitted from an originating station. As an example an automatic stream level gauge code signalling device such as disclosed in the patent to Range et al. No. 2,730,709 may be employed at a remote location in conjunction with a proper transmitting circuit to send stream level readings to a receiving station at definite time intervals, such as every hour or multiple thereof. For purposes of illustration, the synchronizing mechanism will be described in connection with a relay station for receiving such information by radio and retransmitting such information by radio. The timing operation at either or both the originating or receiving station may be powered by electric batteries. Such installations may be remote and may be serviced at long intervals, with the result that the timing mechanism which conditions the receiving station for receiving the data may become out of step with the timing mechanism of the originating station which initiates the sending of such data, as the batteries run down, or as small errors due to mechanical limitations accumulate. The present invention has for its object the provision of means for automatically resetting the timing mechanism at the receiving station into synchronism with that of the originating station each time a set of data is transmitted.

A further object of the present invention is to provide such a mechanism which is inexpensive in nature, which does not rapidly drain the batteries, and which causes the system to stay in synchronism since the communication means utilized for transmitting information effects synchronization at each actuation thereof.

The foregoing objects and advantages may be more readily understood by reference to the following specification, taken in connection with the accompanying drawings wherein like numerals refer to like parts throughout and in which a preferred embodiment of the invention is illustrated and described.

Figure 1:
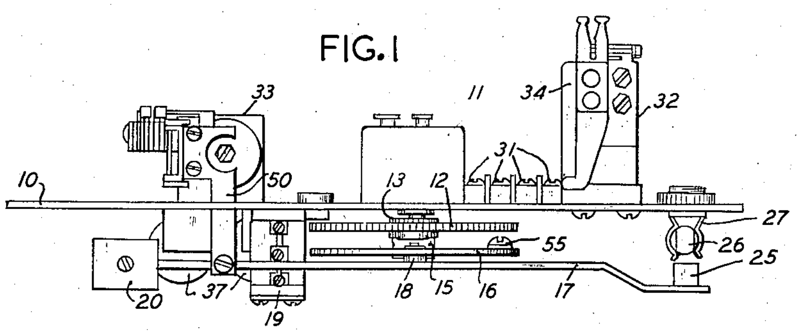
Fig. 1 is a plan view of the synchronizing mechanism of the present invention.

The mechanism is mounted upon an upright plate 10 which may be conveniently mounted in a housing for the data transmitting mechanism (not shown). A motor 11, preferably comprising a battery driven clock motor having a substantially definite number of revolutions per minute, is mounted on the back of plate 10. The armature shaft of the motor projects through an opening in the plate and a gear 12 is affixed thereto in front of the plate. Gear 12 meshes with a pinion 13 mounted upon a supporting shaft 14 fixed to the plate. The forward face of the pinion 13 is projected and supports a rubber sleeve whereby the forwardly projecting portion of pinion 13 constitutes a friction drive wheel 15. A driven disc 16 is constantly urged into peripheral engagement with the periphery of the drive wheel by disc mounting means as follows: A switch actuator arm 17 supports a disc journaling shaft and a ballbearing assembly indicated at 18 whereby the disc is freely rotatable. The arm 17 is pivotally mounted upon an anti-friction pivot assembly 19 mounted upon plate 10. A counter-balance weight 20 is slidably mounted upon a rearwardly projecting portion of arm 17, being adjustably located thereon in such position that the weight of the disc and the switch arm on the opposite side of the pivot overcome the counter-balance and cause the periphery of the disc 16 to be urged constantly against the surface of the drive wheel, but being so located as to permit a slight force causing pivotal movement of the switch arm to move the disc 16 bodily away from the drive wheel. The slightly off balance lever arm 17 supporting the disc 16 and overcoming the effect of the counterbalance 20 constitutes yieldable means constantly urging the disc into contact with the drive wheel, yielding to separate the two when a slight force is exerted to augment the effect of the counterbalance 20.

It is to be appreciated that the relative effective diameters of the drive wheel and the disc 16, and the gear ratio of the gear 12 and pinion 13, are such that the disc 16 is frictionally driven through a complete revolution in approximately a desired interval of time plus a small friction thereof, such as one hour, two hours, six hours, twelve hours, or twenty-four hours, each plus several minutes, depending upon the frequency with which data is to be tabulated. The same relative diameters of drive wheel and disc may be maintained in units for different time intervals by changing the gear ratio of the gear 12 to the pinion 13.

Figures 2, 3, 4, 5:
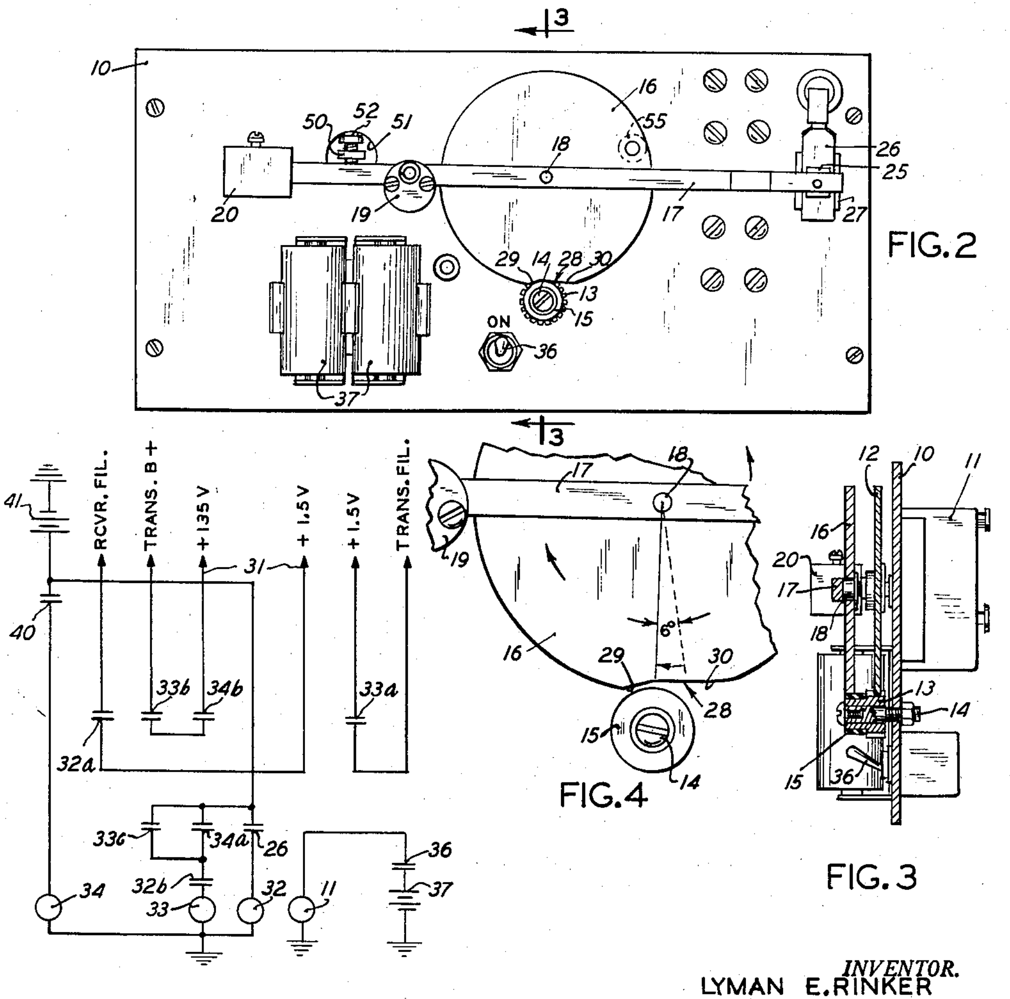
Fig. 2 is a front elevation of Fig. 1.
Fig. 3 is a vertical section taken substantially along line 3—3 of Fig. 2.
Fig. 4 is an enlarged portion of Fig. 2 illustrating the relative relation of parts at the initiation of a synchronizing action.
Fig. 5 is a schematic wiring diagram illustrating the circuit involved and its connections to an associated radio relay circuit.

The free end of switch arm 17 mounts a magnet 25 which moves up and down adjacent a magnetic mercury switch 26 mounted on a clip 27 fixed to the plate 10. The periphery of disc 16 is provided with a recess 28 having a relatively abrupt side 29 on the side of the recess which first contacts the drive wheel, and a relatively sloping side 30 on the opposite side. The disc is constantly urged to make contact so that as the drive wheel enters the recess the magnet 25 is moved downward into circuit closing position, causing closure of the magnetic switch 26, which is in series with a 45-volt, dry cell battery 41 of the control circuit and with a relay 32. The switch 26 and relays 32, 33 and 34 are connected to the radio circuit through connecting posts indicated at 31. The motor 11 is in series with a toggle switch 36, which is normally closed, and with a pair of 4-volt mercury batteries indicated at 37. Closing switch 26 energizes relay 32, closing contacts 32*a* thereof to energize the receiver filaments, and contacts 32*b* thereof to prepare a circuit for relay 33. As indicated in Fig. 4, closing of the switch 26 occurs as the drive-wheel enters the disc recess. At some later time, for example, within approximately the next minute, the originating station would automatically send a synchronizing signal which may now be received by the receiver at the relay station. A relay actuated by the receiver under control of the synchronizing signal closes its contacts 40 which are in series with the 45-volt, dry cell battery 41 in the control circuit, and with relay 34. Closing of switch contacts 40 energizes relay 34, one set of contacts thereof at 34a completing the circuit to energize relay 33. One result of energizing relay 33 is to close a set of contacts 33a thereof which energizes the transmitter filaments of the relay station; another result is to prepare the transmitter B+ circuit through contacts 33b; and another result is to close a set of contacts 33c which bypasses the contacts 34a to lock relay 33 and hold it locked after the first signal pulse is received. Thereafter, the coding device of the transmitter may transmit information to the central station by the receiver keying contacts 40 to actuate relay 34 whose contacts 34b energize the relay station transmitter.

The armature of relay 33 includes a portion 50 which projects forwardly through an opening 51 in the plate 10 and supports an adjustment screw 52, the lower end of which contacts the arm 17 between the pivot 19 and the counter-balance 20. Therefore, upon receiving the first pulse from the originating station arm 17 is pivoted to lift disc 16 from contact with the drive wheel 15, the amount of lifting being determined by adjustment of screw 52 so as to separate the peripheries of the drive wheel and disc by an amount less than the depth of the recess 28. This lifting action will occur within a six degree arc of the disc at a variable point depending upon the amount by which the disc is lagging or running ahead of the desired exact time. The disc supports a weight 55 which is located at about ninety degrees to the recess 28 in the quadrant of the disc following the recess in the direction of rotation. As a result, immediately upon raising of the disc, the disc rotates forwardly until it reengages the drive wheel at an exact point along the sloping side 30 thus resetting the disc to an exact starting point at each data transmitting period. During the remainder of the time that the drive wheel is engaged in the recess the transmitter sends coded signals to the central station, and as the drive wheel leaves the recess the magnet 25 is elevated to open the magnetic switch 26 and de-energize the radio and control circuits.

When the device is installed it is mounted in such fashion that the arm 17 is level. After making all eletrical connections with the radio circuit, the arm 17 is slightly raised manually and disc 16 rotated to the point where the drive wheel is about ready to enter the recess 28. The toggle switch 36 is then closed. The motor is allowed to run for another short period of time, approximately thirty seconds, and then the toggle switch is turned off. Then, when the first synchronizing signal is received the apparatus is observed to be certain that the relay 33 functions to permit the disc to swing a few degrees to the resetting point, whereupon the toggle switch is closed to start motor 11.

Having illustrated and described a preferred embodiment of the present invention, it should be apparent to those skilled in the art that the same permits of modification in detail and arrangement. We claim as our invention all such modifications as come within the true spirit and scope of the appended claims.

We claim:

1. A time synchronizing mechanism comprising a drive wheel, means driving said drive wheel at a fairly constant rate, a driven disc in peripheral contact with and frictionally driven by said drive wheel, the relative effective diameters of said drive wheel and disc being such that the disc completes a revolution in approximately a desired interval of time, the periphery of said disc having a recess therein, means mounting said disc for bodily movement toward and away from said drive wheel, yieldable means constantly urging said disc into contact with said drive wheel, said disc mounting means including a switch actuator, a switch closed by said actuator as said drive wheel enters said recess and opened by said actuator as said drive wheel leaves said recess, a receiver circuit energized upon closure of said switch, a relay in said circuit actuated upon receipt of a synchronizing signal by said circuit, said relay comprising an armature member engageable with said disc mounting means to move said disc away from said drive wheel a distance less than the depth of said recess, and means journaling said disc upon said mounting means for free rotation, said disc being eccentrically weighted whereby the point of engagement of said disc with said drive wheel is automatically reset to a definite starting point within said recess upon actuation of said relay.

2. A time synchronizing mechanism comprising a motor, a friction drive wheel, means driven by said motor and driving said friction drive wheel, a disc in peripheral contact with and frictionally driven by said drive wheel, the periphery of said disc having a recess of abrupt slope on one side and of gradual slope on its other side, means mounting said disc for bodily movement toward and away from said drive wheel, yieldable means constantly urging said disc into contact with said drive wheel, said disc mounting means including a switch actuator, a switch closed by said actuator as said drive wheel enters said recess and opened by said actuator as said drive wheel leaves said recess, a receiver circuit energized upon closure of said switch, a relay actuated upon receipt of a synchronizing signal by said circuit, said relay comprising an armature member engageable with said disc mounting means to move said disc away from said drive wheel a distance less than the depth of said recess, means journaling said disc upon said mounting means for free rotation, said disc being eccentrically weighted adjacent the gradually sloping side of said recess whereby the point of engagement of said disc with said drive wheel is automatically reset to a definite starting point within said recess upon actuation of said relay.

3. A time synchronizing mechanism comprising a motor, a friction drive wheel, means driven by said motor and driving said friction drive wheel, a disc in peripheral contact with and frictionally driven by said drive wheel, the relative effective diameters of said drive wheel and disc being such that the disc completes a revolution in approximately a desired interval of time plus a fraction thereof, the periphery of said disc having a recess of abrupt slope on its side first engaged by said drive wheel and of gradual slope on its other side, means mounting said disc for bodily movement toward and away from said drive wheel, yieldable means constantly urging said disc into contact with said drive wheel, a switch closed by said disc mounting means as said drive wheel enters said recess and opened by said disc mounting means as said drive wheel leaves said recess, a receiver circuit energized upon closure of said switch, a relay energized upon receipt of a synchronizing signal by said circuit, said relay comprising an armature member engageable with said disc mounting means to move said disc away from said drive wheel a distance less than the depth of said recess, and means journaling said disc on said mounting means for free rotation, said disc being eccentrically weighted in the quadrant thereof approaching said drive wheel when the drive wheel is engaged in said recess whereby the point of engagement of said disc with said drive wheel is automatically reset to a definite starting point within said recess upon actuation of said relay.

4. A time synchronizing mechanism comprising a motor, a friction drive wheel, means driven by said motor and driving said friction drive wheel, a disc in peripheral contact with and frictionally driven by said drive wheel, the periphery of said disc having a recess of abrupt slope on one side and of gradual slope on its other side, means mounting said disc for bodily movement toward and away from said drive wheel, yieldable means constantly urging said disc into contact with said drive wheel, a relay, signal receiving means energizing said relay when said drive wheel is engaged in said recess, said relay comprising an armature member engageable with said disc mounting means to move said disc away from said drive wheel a distance less than the depth of said recess, and means journaling said disc upon said mounting means for free turning movement, said disc being eccentrically weighted adjacent the gradually sloping side of said recess whereby the point of engagement of said disc with said drive wheel is automatically reset to a definite starting point within said recess upon actuation of said armature.

5. A time synchronizing mechanism comprising a battery driven motor, a friction drive wheel, means driven by said motor and driving said friction drive wheel, a disc in peripheral contact with and frictionally driven by said drive wheel, the periphery of said disc having a recess therein, means mounting said disc for bodily movement toward and away from said drive wheel, means yieldably urging said disc into contact with said drive wheel, radio signal actuated means to move said disc away from said drive wheel a distance less than the depth of said recess, and means journaling said disc upon said mounting means for free turning movement, said disc being eccentrically weighted adjacent said recess whereby the point of engagement of said disc with said drive wheel is automatically reset to a definite starting point upon actuation of said radio signal actuated means.

References Cited in the file of this patent

UNITED STATES PATENTS

| | | |
|---|---|---|
| 1,816,557 | Zahodiakin | July 28, 1931 |
| 2,149,570 | Barrett | Mar. 7, 1939 |
| 2,367,016 | Gallagher | Jan. 9, 1945 |